G. S. CURTIS.
Harvester Reel.
No. 25,560.
Patented Sept. 27, 1859.
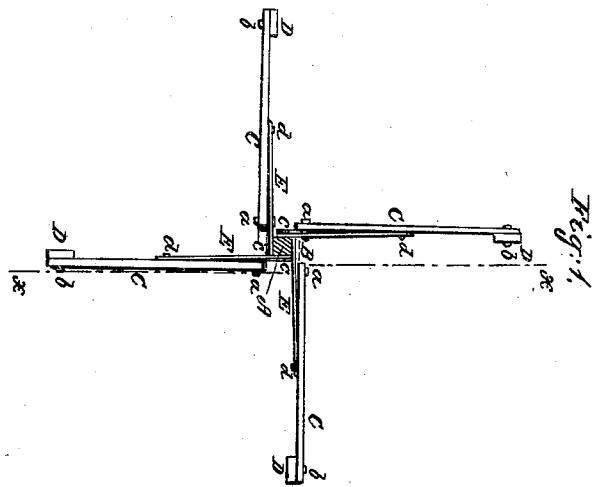
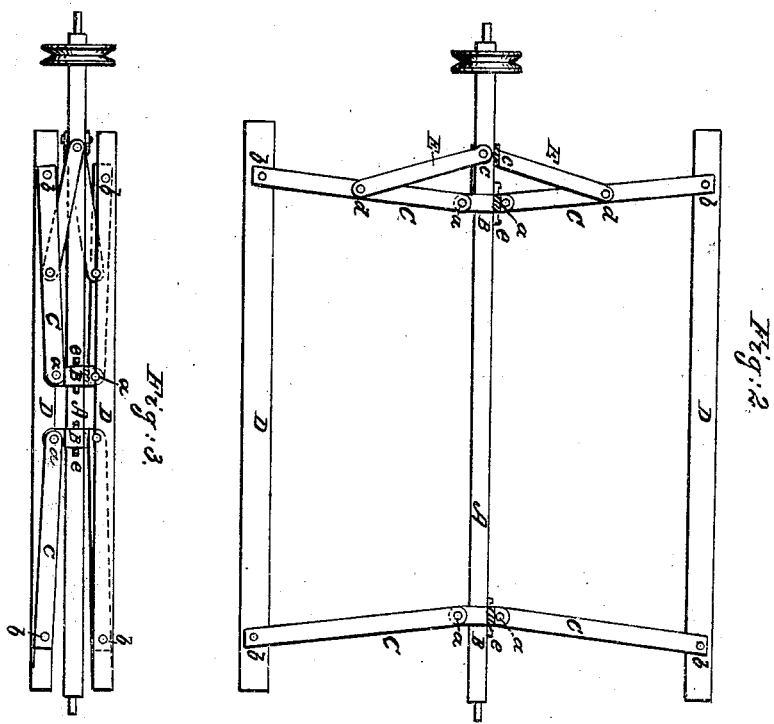
Witnesses: P. P. Givas, Henry Curtis
Inventor: G. S. Curtis

UNITED STATES PATENT OFFICE.

GEORGE S. CURTIS, OF CHICAGO, ILLINOIS.

IMPROVEMENT IN REELS FOR HARVESTERS.

Specification forming part of Letters Patent No. 25,560, dated September 27, 1859.

*To all whom it may concern:*

Be it known that I, GEORGE S. CURTIS, of Chicago, in the county of Cook and State of Illinois, have invented a new and useful Improvement in Reels for Harvesters; and I do hereby declare that the following is a full, clear, and exact description of the same, reference being had to the annexed drawings, making a part of this specification, in which—

Figure 1 is an end view of a harvester-reel constructed according to my invention. Fig. 2 is a front sectional view of the same, taken in the line $x\,x$, Fig. 1. Fig. 3 is a view of the same in a folded state.

Similar letters of reference indicate corresponding parts in the several figures.

The invention consists in having the arms of the wings or beaters of the reel attached by pivots to sockets or sliding heads on the reel-shaft, the outer ends of the arms being also attached to the wings or beaters by pivots, and one set of arms having braces attached to them and to the shaft, the whole being arranged substantially as hereinafter shown, whereby the desired object is attained.

To enable those skilled in the art to fully understand and construct my invention, I will proceed to describe it.

A represents the shaft of the reel, which may be of rectangular form, attached to the harvester and driven or rotated in the usual or any proper manner. On the shaft A two sliding heads, B B, are placed. These heads are of metal, and are allowed to slide freely on the shaft A, which may be of wood, the material usually employed for such purpose. The heads B may be of rectangular form, one end of each side projecting beyond or over its adjoining side, and each having an arm, C, attached by a pivot, $a$. The arms C are allowed to work freely on their pivots, and their outer ends are attached by pivots $b$ to wings or beaters D, which may be of the usual form and construction.

To each side of the shaft A a bar, E, is attached by a pivot, $c$. These bars are attached at their outer ends, by pivots $d$, to the arms C, one bar being attached to each arm. In each head B a key or wedge, $e$, is placed, by which the heads B may be secured at any desired point on the shaft A within the range of their movement.

From the above description it will be seen that by loosening the keys or wedges $e$ in the sockets or heads B the heads may be moved toward each other and the arms C and wings D folded together in close proximity to the shaft A. (See Fig. 3.) In this state it will be seen that the reel may be adjusted within a very small compass and the transportation be greatly facilitated. At times, also, when the harvester is not in use the reel may be readily stowed away in a small compass without the liability of being broken. The reel may be expanded from a folded state and adjusted in a proper working position of greater or less diameter, as may be required, with the greatest facility, the keys or wedges $e$, by being driven in between the sockets or heads and the shaft, firmly retaining said heads in proper position.

The bars E are an essential feature of the invention, for they prevent the heads B from moving on the shaft A beyond their proper scope, and also permit the reel to open and close without cramping. The bars E may be of metal.

Having thus described my invention, what I claim as new, and desire to secure by Letters Patent, is—

The employment of sliding heads B and pivoted arms C and bars E, in combination with the reel-shaft A and beaters D, substantially as herein shown and described, so that the diameter of the reel can be expanded or contracted, as and for the purpose set forth.

GEO. S. CURTIS.

Witnesses:
J. P. GROVES,
C. D. WOLF,
HENRY CURTIS.